United States Patent
Yoo et al.

(10) Patent No.: US 12,436,109 B2
(45) Date of Patent: Oct. 7, 2025

(54) SUBSTRATE INSPECTION DEVICE AND SUBSTRATE INSPECTION METHOD USING THE SAME

(71) Applicant: Samsung Display Co., LTD., Yongin-si (KR)

(72) Inventors: Sung Hune Yoo, Yongin-si (KR); Dongwook Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 146 days.

(21) Appl. No.: 18/449,767

(22) Filed: Aug. 15, 2023

(65) Prior Publication Data
US 2024/0201100 A1   Jun. 20, 2024

(30) Foreign Application Priority Data
Dec. 20, 2022 (KR) .................. 10-2022-0179179

(51) Int. Cl.
*G01N 21/88* (2006.01)
*G01N 21/84* (2006.01)
*G01N 21/95* (2006.01)

(52) U.S. Cl.
CPC ..... *G01N 21/8851* (2013.01); *G01N 21/8422* (2013.01); *G01N 21/9515* (2013.01); *G01N 2021/8427* (2013.01); *G01N 2021/8887* (2013.01); *G01N 2021/8896* (2013.01)

(58) Field of Classification Search
CPC .......... G01N 21/8851; G01N 21/8422; G01N 21/9515; G01N 2021/8427; G01N 2021/8887; G01N 2021/8896
See application file for complete search history.

(56) References Cited

U.S. PATENT DOCUMENTS

2014/0233843 A1* 8/2014 Cocca .............. H10K 71/13
                                                                 382/145

FOREIGN PATENT DOCUMENTS

JP          2022-92958       6/2022
KR     10-2022-0083590       6/2022

* cited by examiner

*Primary Examiner* — Jamil Ahmed
(74) *Attorney, Agent, or Firm* — CANTOR COLBURN LLP

(57) ABSTRACT

A substrate inspection device includes an imaging part that is disposed in a chamber and obtains an input image by photographing a substrate coated with a solution, and an analysis part that converts brightness data of the input image into grayscale data and analyzes a film shape of a pixel region based on the grayscale data.

20 Claims, 12 Drawing Sheets

FIG. 9
S330
(a)
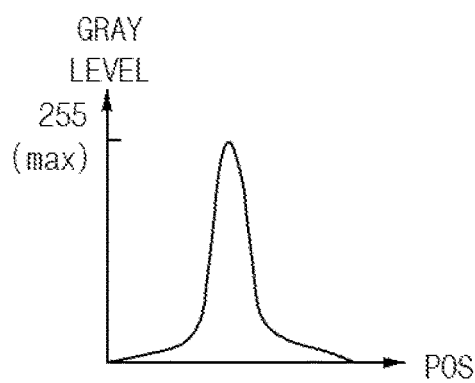
(b)
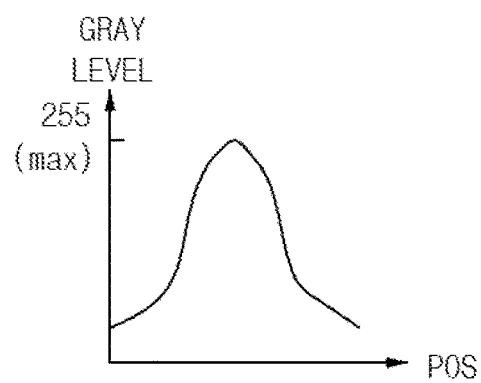
(c)
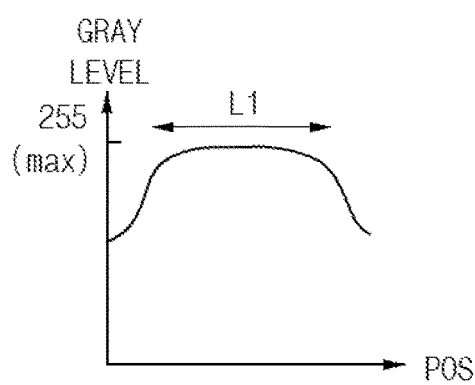
(d)
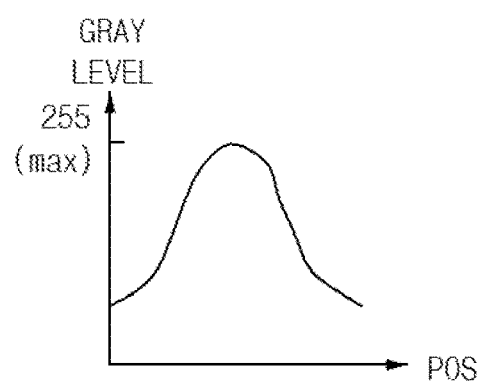
(e)
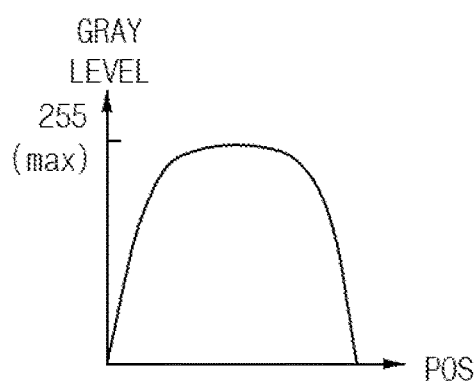

SUBSTRATE INSPECTION DEVICE AND SUBSTRATE INSPECTION METHOD USING THE SAME

CROSS-REFERENCE TO RELATED APPLICATION(S)

This application claims priority to and benefits of Korean Patent Application No. 10-2022-0179179 under 35 U.S.C. § 119, filed on Dec. 20, 2022 in the Korean Intellectual Property Office (KIPO), the entire disclosure of which is incorporated by reference herein.

BACKGROUND

1. Technical Field

Embodiments relate to a substrate inspection device and a substrate inspection method using the same. More specifically, embodiments relate to a substrate inspection device for inspecting a substrate located in a vacuum drying device and a substrate inspection method using the same.

2. Description of the Related Art

As information technology develops, the importance of display devices, which are communication media between users and information, is being highlighted. Accordingly, the use of display devices such as a liquid crystal display device, an organic light-emitting display device, a plasma display device, and the like is increasing.

The organic light-emitting display device includes a light-emitting element including an organic material. An organic layer included in the light-emitting element may be formed by a printing process.

SUMMARY

The disclosure may provide a substrate inspection device.

The disclosure may provide a substrate inspection method using the substrate inspection device.

The technical objectives to be achieved by the disclosure are not limited to those described herein, and other technical objectives that are not mentioned herein would be clearly understood by a person skilled in the art from the description of the disclosure.

A substrate inspection device according to an embodiment of the disclosure may include an imaging part that is disposed in a chamber that obtains an input image by photographing a substrate coated with a solution, and an analysis part that converts brightness data of the input image into grayscale data and analyzes a film shape of a pixel region based on the grayscale data.

In an embodiment, the analysis part may include a region setting part, a converting part, and a matching part. The region setting part may set at least one-pixel region as a region of interest (ROI) in the input image. The converting part may convert brightness data of the ROI into the grayscale data. The matching part may match a horizontal section of the grayscale data for each position of the pixel region with a process condition of the chamber.

In an embodiment, the pixel region may include a central region and an outer region surrounding the central region. Grayscale data of the central region may be greater than grayscale data of the outer region.

In an embodiment, the substrate inspection device may further include a control part including a storing part that stores the process condition of the chamber, a property of the solution, the input image, and the grayscale data.

In an embodiment, the control part may further include a condition generating part that derives a process recipe based on data stored in the storing part in case that the property of the solution or a shape of final film is inputted.

In an embodiment, the shape of the final film may include a thickness of the final film.

In an embodiment, the process recipe may include a reduced pressure profile in the chamber.

In an embodiment, the control part may further include a facility control part that controls the chamber to automatically proceed with a drying process based on the process recipe generated by the condition generating part.

In an embodiment, the imaging part may be disposed in a direction crossing a normal line of the substrate.

In an embodiment, the analysis part may further include an angle calculating part that calculates a droplet angle of the solution based on the input image.

A substrate inspection method according to an embodiment of the disclosure may include disposing a substrate coated with a solution in a chamber, obtaining an input image by photographing the substrate, and then analyzing a film shape of a pixel region based on the grayscale data by converting brightness data of the input image into grayscale data.

In an embodiment, the analyzing of the film shape may include setting at least one-pixel region in the input image as a region of interest (ROI), converting brightness data of the ROI into the grayscale data, and matching a horizontal section of the grayscale data for each position of the pixel region with a process condition of the chamber.

In an embodiment, the pixel region may include a central region and an outer region surrounding the central region. Grayscale data of the central region may be greater than grayscale data of the outer region.

In an embodiment, the substrate inspection method may further include storing the process condition of the chamber, a property of the solution, the input image, and the grayscale data.

In an embodiment, the substrate inspection method may further include inputting the property of the solution or a shape of the final film, and deriving a process recipe based on the stored process condition of the chamber, the stored property of the solution, the stored input image, and the stored grayscale data.

In an embodiment, the inputting of the shape of the final film may be inputting a thickness of the final film.

In an embodiment, the deriving of the process recipe may be deriving a reduced pressure profile in the chamber.

In an embodiment, the substrate inspection method may further include controlling the chamber to automatically proceed with a drying process based on the process recipe after the deriving of the process recipe.

In an embodiment, the input image may be obtained by an imaging part disposed in a direction crossing a normal line of the substrate.

In an embodiment, the analyzing of the film shape may further include calculating a droplet angle of the solution based on the input image.

In the substrate inspection device according to an embodiment of the disclosure may include an imaging part disposed in a chamber that obtains an input image by photographing a substrate coated with a solution, and an analysis part that converts brightness data of the input image into grayscale data and analyzes a film shape of a pixel region based on the grayscale data. Accordingly, the substrate inspection device may control the drying process in the pixel region precisely and improve uniformity of a film thickness.

BRIEF DESCRIPTION OF THE DRAWINGS

FIGS. 5, 6, 7, 8, 9, 10, 11, 12, and 13 are schematic views illustrating a substrate inspection method according to an embodiment of the disclosure.

DETAILED DESCRIPTION OF THE EMBODIMENTS

Figure 1:
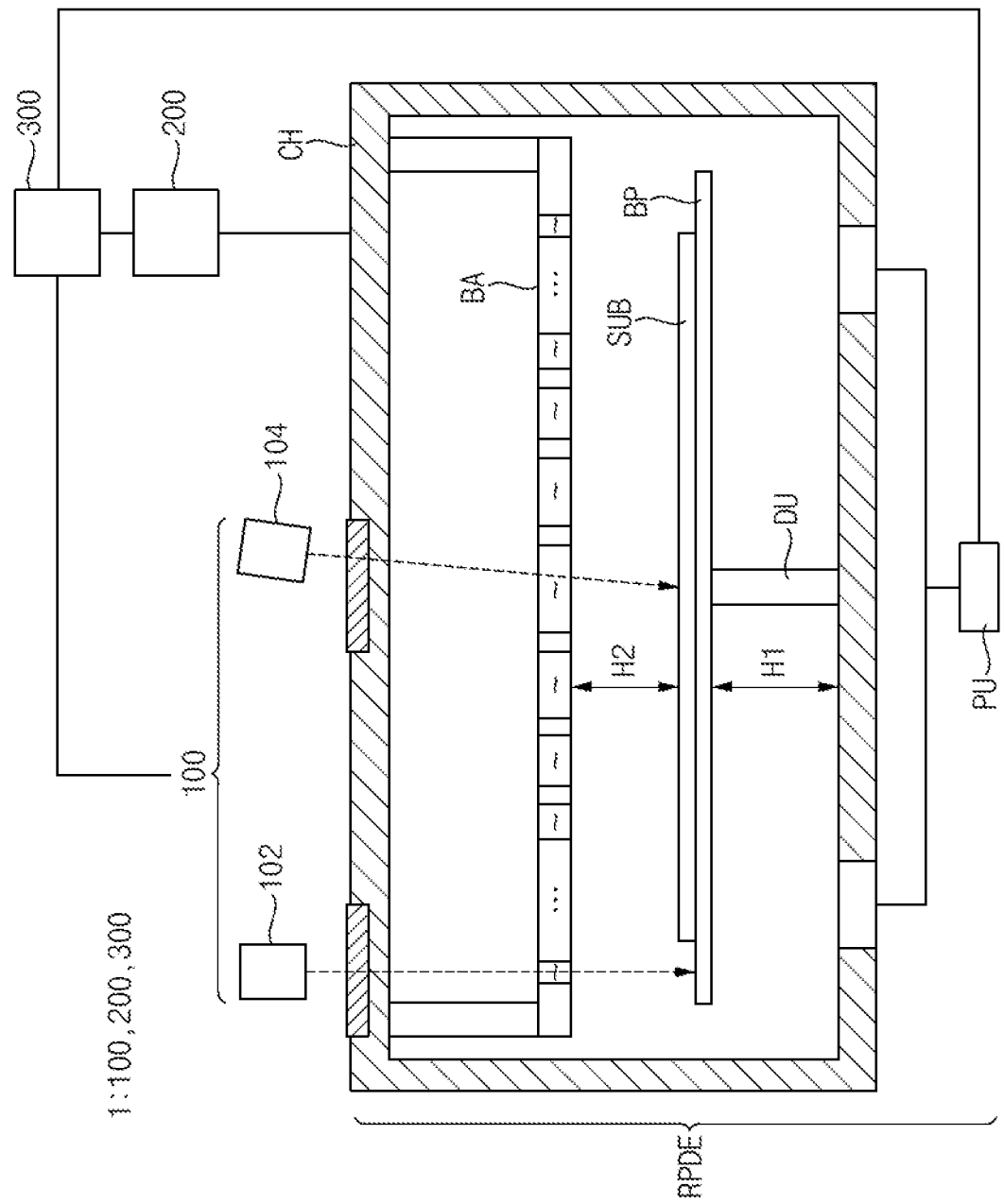
FIGS. 1 and 2 are schematic views illustrating a substrate inspection device 1 according to an embodiment of the disclosure.

Hereinafter, disclosure in accordance with embodiments will be described in more detail with reference to the accompanying drawings. The same reference numerals are used for the same components in the drawings, and redundant descriptions of the same components will be omitted.

When an element is referred to as being "on," "connected to," or "coupled to" another element, it may be directly on, connected to, or coupled to the other element or intervening elements or layers may be present. When, however, an element is referred to as being "directly on." "directly connected to," or "directly coupled to" another element, there are no intervening elements or layers present. To this end, the term "connected" may refer to physical, electrical, and/or fluid connection, with or without intervening elements.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

The term "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Figure 2:
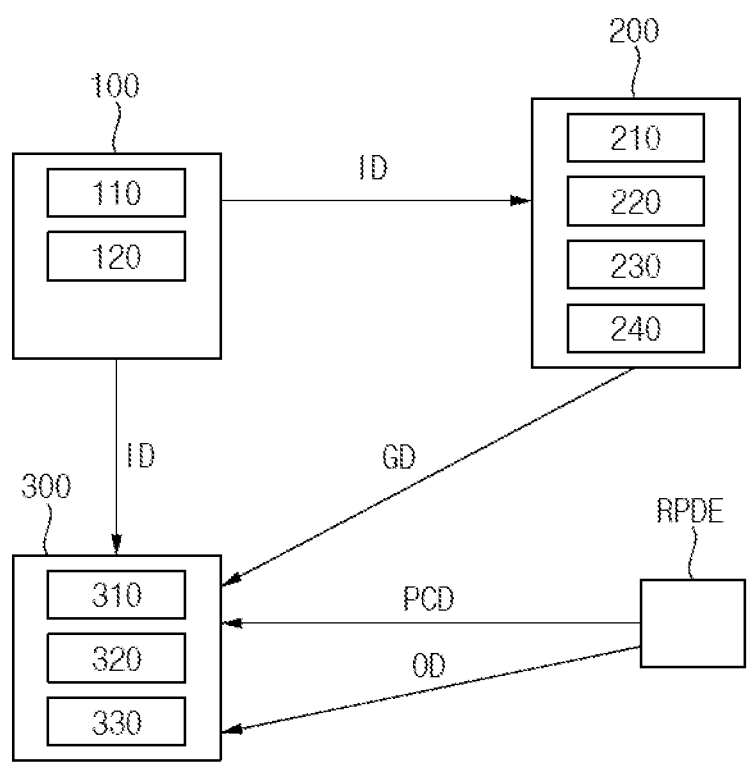

FIGS. 1 and 2 are schematic views illustrating a substrate inspection device 1 according to an embodiment of the disclosure.

Referring to FIGS. 1 and 2, a reduced pressure drying device RPDE may include a chamber CH, a pump PU connected to the chamber CH, and a baffle BA located inside the chamber CH.

The chamber CH may include an upper surface, a lower surface disposed parallel to the upper surface, and side surfaces that seal an inside of the chamber CH from the outside.

A substrate SUB may be disposed in the chamber CH. The substrate SUB may be disposed on a base plate BP. The base plate BP may move up or down and/or may hold its position by a driving unit (or driving part) DU.

The pump PU may discharge gas inside the chamber CH to the outside of the chamber CH. By virtue of this, the pump PU may lower an internal pressure of the chamber CH. For example, the pump PU may be at least one of a dry pump, a turbo pump, and the like. The pump PU may discharge not only the gas but also a material evaporated from a solution on the substrate SUB to the outside of the chamber CH.

For example, the baffle BA may have a flat upper surface. However, the disclosure is not limited thereto, and for another example, the baffle BA may have a downwardly inclined '⋏' shape from a central portion toward an outer portion surrounding the central portion. Specifically, a first separation distance between the central portion of the baffle BA and the upper surface of the chamber CH may be greater than a second separation distance between the outer portion of the baffle BA and the upper surface of the chamber CH.

The baffle BA may prevent the solution on the substrate SUB from rapidly evaporating from the substrate SUB. The baffle BA may capture an evaporated material and may maintain a constant vapor pressure so that an organic layer (e.g., a dry film) having a thickness (e.g., a substantially uniform thickness) may be formed on the substrate SUB.

The substrate inspection device 1 according to an embodiment of the disclosure may control a shape of the dry film precisely by observing a droplet (e.g., an ink droplet DR of FIG. 3) on the substrate SUB disposed inside of the reduced pressure drying device RPDE. To this end, the substrate inspection device 1 may include an imaging unit (or imaging part) 100, an analysis unit (or analysis part) 200, and a control unit (or control part) 300.

The imaging unit 100 may be disposed outside of the chamber CH. The imaging unit 100 may obtain an input image ID by photographing the substrate SUB coated with the solution. To this end, the imaging unit 100 may include an imaging part 110 and an imaging controller 120. The imaging part 110 may include a first imaging part 102 and a second imaging part 104.

The imaging part 110 may convert light into electricity. For example, the imaging part 110 may be a device capable of capturing a still image. For example, the imaging part 110 may be various imaging devices such as a camera, a mobile phone, a smart phone, a tablet PC, a laptop computer, a camcorder, and the like. However, the disclosure is not limited thereto. The imaging part 110 may be a device capable of capturing a dynamic image.

The imaging part 110 may photograph the substrate SUB through a transmission window of the chamber CH. The imaging part 110 may be installed at various angles. In an embodiment, the first imaging part 102 may be disposed in a direction parallel to a normal line of the substrate SUB, and the second imaging part 104 may be disposed in a direction crossing (or intersecting) the normal line of the substrate SUB. However, the disclosure is not limited thereto. In another embodiment, each of the first imaging part 102 and the second imaging part 104 may be disposed in a same direction. For example, each of the first imaging part 102 and the second imaging unit 104 may be disposed in the direction parallel to the normal line of the substrate SUB. As another example, each of the first imaging part 102 and the second imaging part 104 may be disposed in the direction crossing the normal line of the substrate SUB.

At least two imaging parts 110 may be installed. For example, the imaging part 110 may be installed at positions where a central portion and an outer portion surrounding the central portion of the substrate SUB may be photographed.

The imaging controller 120 may control the imaging part 110. For example, the imaging controller 120 may control a photographing angle, shutter speed, and the like of the imaging part 110. The photographing angle may be changed by adjusting an installation angle of the imaging part 110 and/or a driving angle of a lens included in the imaging part 110.

The analysis unit 200 may convert brightness data of the input image ID into grayscale data GD. The analysis unit 200 may analyze a film shape of a pixel region (e.g., a pixel region POS of FIG. 3) based on the grayscale data GD. To this end, the analysis unit 200 may include, e.g., at least one of a region setting part 210, a converting part 220, an analyzing part 230, and a matching part 240.

Figure 3:
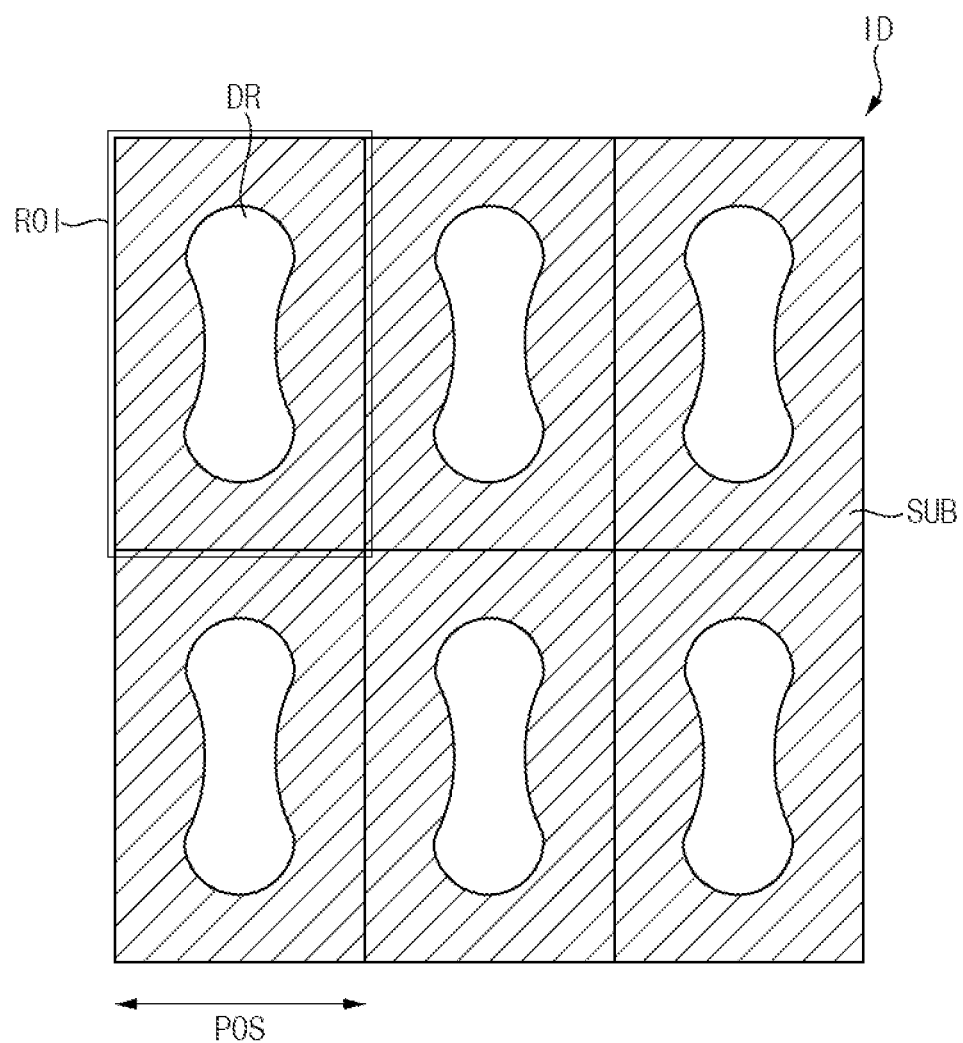
FIG. 3 is a schematic view illustrating an embodiment of the input image ID obtained by the imaging part 100 included in the substrate inspection apparatus 1 of FIG. 1.

The region setting part 210 may set at least one-pixel region as a region of interest (e.g., a region of interest (ROI) of FIG. 3) in the input image ID. For example, each of a red pixel region, a green pixel region, and a blue pixel region may be set as the region of interest. As another example, red pixel regions may be set as the region of interest.

The converting part 220 may convert the brightness data of the region of interest into the grayscale data GD. For example, the droplet may have a curvature. Accordingly, the brightness data may have a different value for each position within the pixel region. The grayscale data may have the largest value of about 255 in case of white and the smallest value of about 0 in case of black. As another example, the brightness data for each position within the pixel region may have a same value. In case that a surface of the dry film is flat, the grayscale data GD value of flat positions may be a same.

The analyzing part 230 may interpret and/or analyze the grayscale data GD. During the drying process, the grayscale data GD may have the different value for each position within the pixel region. The analyzing part 230 may analyze a change in the shape of the dry film by analyzing the grayscale data GD.

In an embodiment, the analyzing part 230 may convert a thickness of the droplet for each position within the pixel region into grayscale data GD. The analyzing part 230 may convert the grayscale data GD for each position within the pixel region into the thickness of the droplet. By virtue of this, during the progress, a thickness of the dry film for each position within the pixel region may be checked and stored.

In another embodiment, the analyzing part 230 may further include an angle calculating part. The angle calculating part may calculate a droplet angle of the solution based on the input image ID. As described above, the imaging part 110 may photograph the droplet at various angles. The analyzing part 230 may convert the input image ID captured at various angles into data related to the angle of the droplet. The analyzing part 230 may also calculate a property of the droplet, e.g., the thickness of the droplet, by using the data related to the angle of the droplet.

The matching part 240 may match a horizontal section of the grayscale data GD for each position in the pixel region with a process condition. For example, the analyzing part 230 may analyze the change in the shape of the dry film in the pixel region due to a change in the internal pressure of the chamber CH during the drying process. More specifically, an internal pressure condition of the chamber CH in case that the drying starts, a reduced pressure profile in which the shape of the dry film becomes flat, the shape of the dry film after the drying process (e.g., the thickness of the dry film) and the like may be analyzed. An analyzed data may be stored as a database in a storing part 310 and may be utilized in case that a condition generating part 320 generates a process recipe.

The control unit 300 may control a formation of a desired film shape by storing various data, generating the process recipe based on the stored data, and automatically proceeding with the drying process by applying the generated process recipe. To this end, the control unit 300 may include at least one of the storing part 310, the condition generating part 320, and a facility control part 330.

The storing part 310 may collect and store various types of data from other components, e.g., the imaging unit 100, the analysis unit 200, and/or the control unit 300.

In an embodiment, the storing part 310 may collect and store various data desired or necessary for an operation of the imaging unit 100. For example, the storing part 310 may collect and store shutter speed and the like.

In another embodiment, the storing part 310 may collect and store the data converted and analyzed by the analysis unit 200. For example, the storing part 310 may collect and store the process condition of the chamber CH, a property of the solution discharged onto the substrate SUB, the input image ID, and the grayscale data GD. Examples of process factors included in the process condition may include a height H1 of the substrate SUB, a distance H2 between the baffle BA and the substrate SUB, the internal pressure of the chamber CH, a temperature of the substrate SUB, or the like. The process factors may be changed in the process of finding the process condition.

The control unit 300 may further include a machine learning system. The machine learning system may include one or more data collection circuits and/or analysis systems.

The data collection circuit may collect various data or data samples. For example, the data collection circuit may collect the image photographed by the imaging unit 100 (e.g., the input image ID of FIG. 3) and the grayscale data converted from the photographed image (e.g., a grayscale data GD1 of FIG. 4 or a grayscale data GD2 of FIG. 8), image fusion data of the photographed image and the grayscale data, internal pressure data of the chamber CH, temperature data of the substrate SUB, and property data of the solution discharged onto the substrate SUB.

The data collection circuit may collect data samples multiple times during one cycle of the drying process. For example, the data collection circuit may collect the data samples at 400 frames per second. However, the embodiments are not limited thereto.

The analysis system may include a training module and an analysis module.

The analysis system may include one or more processors having associated memory. For example, the processor may be at least one of an application specific integrated circuit (ASIC), a general or special purpose central processing unit (CPU), a digital signal processor, DSP), a graphics processing unit (GPU), a field programmable gate array (FPGA), and the like.

The training module may generate and train machine learning models for classifying the film shape of the pixel region formed according to the property of the solution and the process condition of the chamber CH.

Generation and training of the machine learning models may be based on training data provided by the data collection circuit. For example, the training module may collect a training data set from the data collection circuit, and train the analysis module analyzing the film shape of the pixel region using the training data set.

The analysis module may be a joint fusion model in which two or more neural networks independently trained by using data collected from different types of the data collection circuits are integrated. Alternatively, the analysis module may be a deep neural network trained by using a single data source collected from the data collection circuit.

The condition generating part 320 may derive the process recipe based on the data stored in the storing part 310 in case that the property of the solution and/or the shape of a desired final film (e.g., the dry film) are inputted. The process recipe may be defined as the process to which the process factors changed in the process of the finding of the process conditions are applied.

In an embodiment, the shape of the final film may include a thickness of the final film, and the process recipe may include the reduced pressure profile in the chamber.

In another embodiment, a new process recipe suitable for a new ink may be generated by analyzing a degree of reaction of the new ink to the process conditions based on the stored data.

The facility control part 330 may automatically control the operation of the reduced pressure drying device RPDE by applying the process recipe generated by the condition generating part 320.

For example, the facility control part 330 may transmit an output data OD to the reduced pressure drying device RPDE. The output data OD may include the new process recipe. The reduced pressure drying device RPDE receiving the output data OD may automatically perform the drying process according to the new process recipe.

Figure 4:
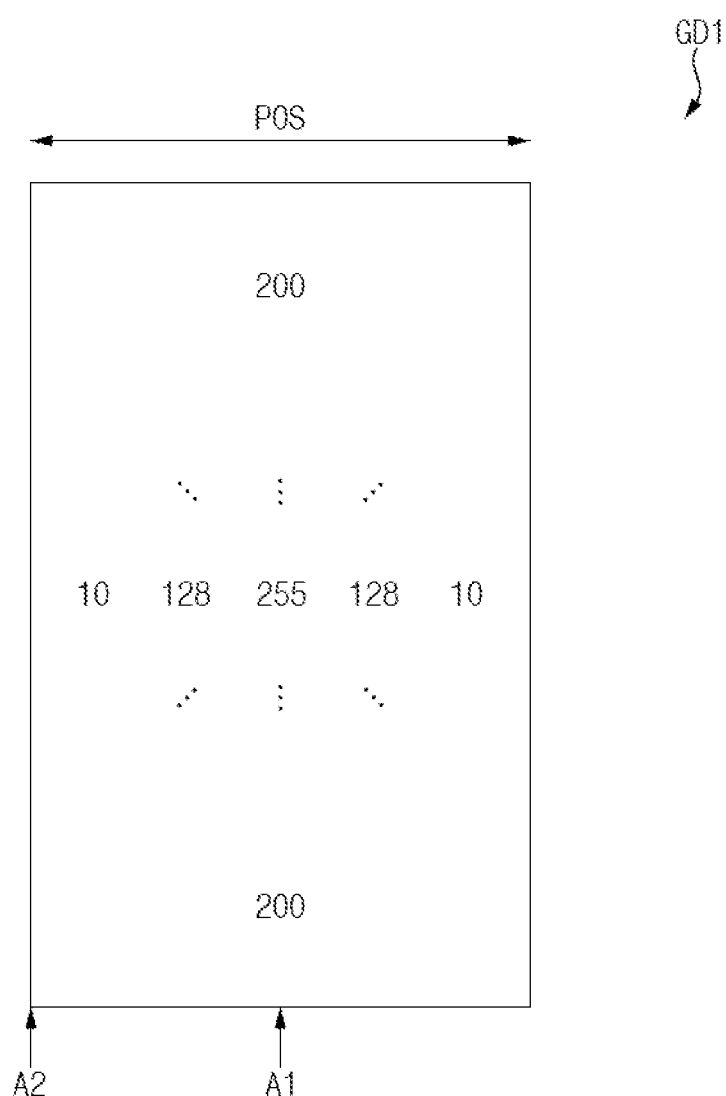
FIG. 4 is a schematic view illustrating an embodiment of the grayscale data GD converted by the analysis part 300 included in the substrate inspection apparatus 1 of FIG. 1.

FIG. 3 is a view illustrating an embodiment of the input image ID obtained by the imaging unit 100 included in the substrate inspection apparatus 1 of FIG. 1. FIG. 4 is a view illustrating an embodiment of the grayscale data GD converted by the analysis unit 200 included in the substrate inspection apparatus 1 of FIG. 1.

Referring to FIG. 3, the substrate SUB may include pixels. The substrate SUB may be divided into a display region and a non-display region. The display region may be a region where an image is displayed by combining light emitted from the pixels. The non-display region may be a region surrounding the display region.

The pixels may be arranged in a matrix form on the substrate SUB. The pixels may include at least one a red pixel emitting red light, a green pixel emitting green light, and a blue pixel emitting blue light.

At least one-pixel region POS of the input image ID may be set as the region of interest ROI. For example, each of the red pixel region, the green pixel region, and the blue pixel region may be set as the region of interest. As another example, the red pixel regions may be set as the region of interest and averaged.

The input image ID may include the pixel regions POS arranged on the substrate SUB. For example, the input image ID may include about 24-pixel regions POS.

The ink droplet DR may be formed within the pixel region POS on the substrate SUB. The ink droplet DR may be formed through a discharge process. Specifically, the ink droplet DR may be formed by discharging ink from an inkjet head.

The ink droplet DR may include a light-emitting-layer forming material (or material for forming a light-emitting layer). For example, the ink droplet DR may include a quantum dot.

The ink droplet DR may undergo the drying process after the discharging process. For example, the drying process may include a curing process. The drying process may involve evaporation of a solvent in the ink droplet DR.

Referring to FIGS. 3 and 4, the input image ID may be converted into the grayscale data GD. The pixel region POS may include a central region A1 and an outer region A2 surrounding the central region A1.

The grayscale data GD of the central region A1 may be greater than the grayscale data GD of the outer region A2. For example, the grayscale data GD of the central region A1 may be about 255, which is the largest value, and the grayscale data GD of the outer region A2 may be about 10, which is a smaller value than the grayscale data GD of the central region A1.

As described above with reference to FIGS. 1, 2, 3, and 4, the substrate inspection device 1 may include the imaging part 110 and the converting part 220. The imaging part 110 may obtain the input image ID by photographing the substrate SUB. The converting part 220 may convert the input image ID into the grayscale data GD to analyze a drying state for each position of the substrate SUB and/or a drying state for each position within the pixel region POS. Accordingly, the substrate inspection device 1 may precisely control the drying process within the pixel region POS to improve the uniformity of the dry film thickness.

The substrate inspection device 1 may include at least one of the analyzing part 230, the matching part 240, the storing part 310, and the condition generating part 320. The analyzing part 230 may automatically analyze a change in the shape of the droplet due to the change in the process condition. Alternatively, the analyzing part 230 may automatically analyze a change in the shape of the droplet due to a change in the property of the solution. The matching part 240 may match the analysis data with the process condition. The storage unit 310 may build the database including at least one of the input image ID, the grayscale data GD, and a process condition PCD. The condition generating part 320 may automatically generate the process recipe for forming the desired shape of the dry film using the database even in case that a type of the solution and/or the process condition PCD and the like are changed.

The substrate inspection device 1 may include the facility control part 330. The facility control part 330 may automatically control the operation of the reduced pressure drying device RPDE by applying the process recipe generated by the condition generating part 320.

FIGS. 5, 6, 7, 8, 9, 10, 11, 12, and 13 are schematic views illustrating a substrate inspection method according to an embodiment of the disclosure. Hereinafter, repetitive descriptions with respect to those of the substrate inspection device 1 described above with reference to FIGS. 1, 2, 3, and 4 will be omitted or simplified.

Figure 5:
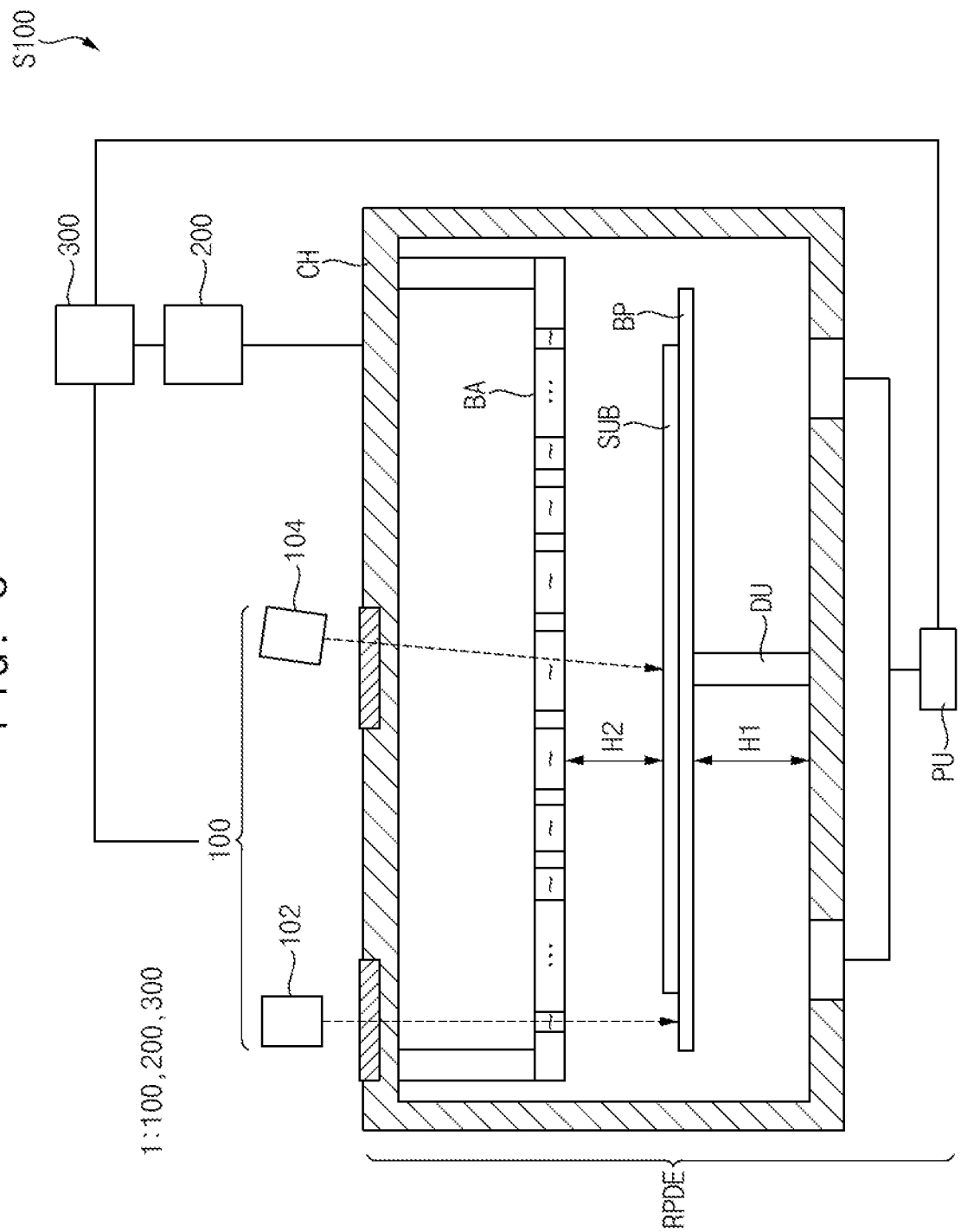

Referring to FIG. 5, the substrate SUB coated with the solution may be disposed within the chamber CH (S100).

The substrate SUB coated with the solution may be formed through a printing process. For example, after sequentially forming an element-line layer, a first electrode, and a pixel-defining layer on the substrate SUB, the organic layer may be formed through the printing process.

The substrate SUB may include an insulating material. For example, a rigid substrate SUB may include glass. As another example, a flexible substrate SUB may include polyimide. However, the embodiments are not limited thereto, and the substrate SUB may include or may be made of one or more various materials.

The element-line layer may include a thin film transistor. For example, the thin film transistor may include an active region including an oxide semiconductor. As another example, the thin film transistor may include the active region including silicon. For example, the thin film transistor may include at least one of amorphous silicon, polycrystalline silicon, single-crystal silicon, and the like.

The first electrode may be formed by a photolithography method. For example, the first electrode may include a transparent oxide. For example, the transparent oxide may include at least one of indium tin oxide (ITO), indium zinc oxide (IZO), zinc oxide (ZnO), and the like. As another example, the first electrode may include metal. For example, the metal may include at least one of Ag, Mg, Al, Pt, Pd, Au, Ni, Nd, Ir, Cr, and the like. These may be used alone or in combination with each other.

The first electrode may be connected to at least one electrode included in the thin film transistor. For example, the first electrode may be an anode electrode. The anode electrode may receive a signal applied from at least one electrode included in the thin film transistor and provide holes to the light-emitting layer included in the organic layer. As another example, the first electrode may be a cathode electrode. The cathode electrode may provide an electron to the light-emitting layer.

The pixel-defining layer may be formed by the photolithography method. For example, the pixel-defining layer may include an organic insulating material. For example, the pixel-defining layer may include at least one of benzocyclobutene (BCB), polyimide (PI), polyamide (PA), acrylic resin, phenol resin, and the like. As another example, the pixel-defining layer may include an inorganic insulating material. For example, the pixel-defining layer may include silicon nitride and the like. However, the embodiments are not limited thereto.

The pixel-defining layer may include a liquid-repellent material. For example, the pixel-defining layer may include the insulating material having a contact angle of about 40 degrees or greater with respect to an organic solution. The insulating material may include a polymer resin containing fluorine or the like.

The pixel-defining layer may have an opening exposing the first electrode on the substrate SUB. The pixel-defining layer may partition each of the pixels.

The organic layer may be formed by a solution coating method. For example, the organic layer may be formed by an inkjet printing method, a nozzle printing method, and the like. For example, the organic layer may be formed by discharging the solution from the inkjet head including nozzles on the substrate SUB.

The solution may include an organic material and the solvent. The solution may be discharged within the opening defined by the pixel-defining layer to form a hole injection layer, a hole transport layer, the light emitting layer, an electron transport layer, and/or an electron injection layer.

The internal pressure of the chamber CH may be reduced through an exhausting process. The exhausting process may be a process of discharging the gas inside the chamber CH to the outside of the chamber CH by using the pump PU. The exhausting process may be included in the drying process of the solution.

An evaporation rate at the central portion of the substrate SUB and an evaporation rate at the outer portion of the substrate SUB surrounding the central portion may be different from each other. For example, the evaporation rate at the outer portion of the substrate SUB may be faster (or greater) than the evaporation rate at the central portion of the substrate SUB. For this reason, a thickness of the organic layer formed on the central portion of the substrate SUB and a thickness of the organic layer formed on the outer portion of the substrate SUB may be different from each other. As an evaporation rate difference increases, a thickness difference of the organic layer may also increase.

An airflow that shortens an exhaust path of the gas generated in case that the solvent evaporates from the solution on the substrate SUB, may be formed by spraying an inert gas toward the substrate SUB. For example, the inert gas may include at least one of $N_2$ gas, Ar gas, $H_2$ gas, CO gas, and the like. These may be used alone or in combination with each other. The organic layer may be formed flat by spraying the inert gas onto the substrate SUB.

Figure 6:
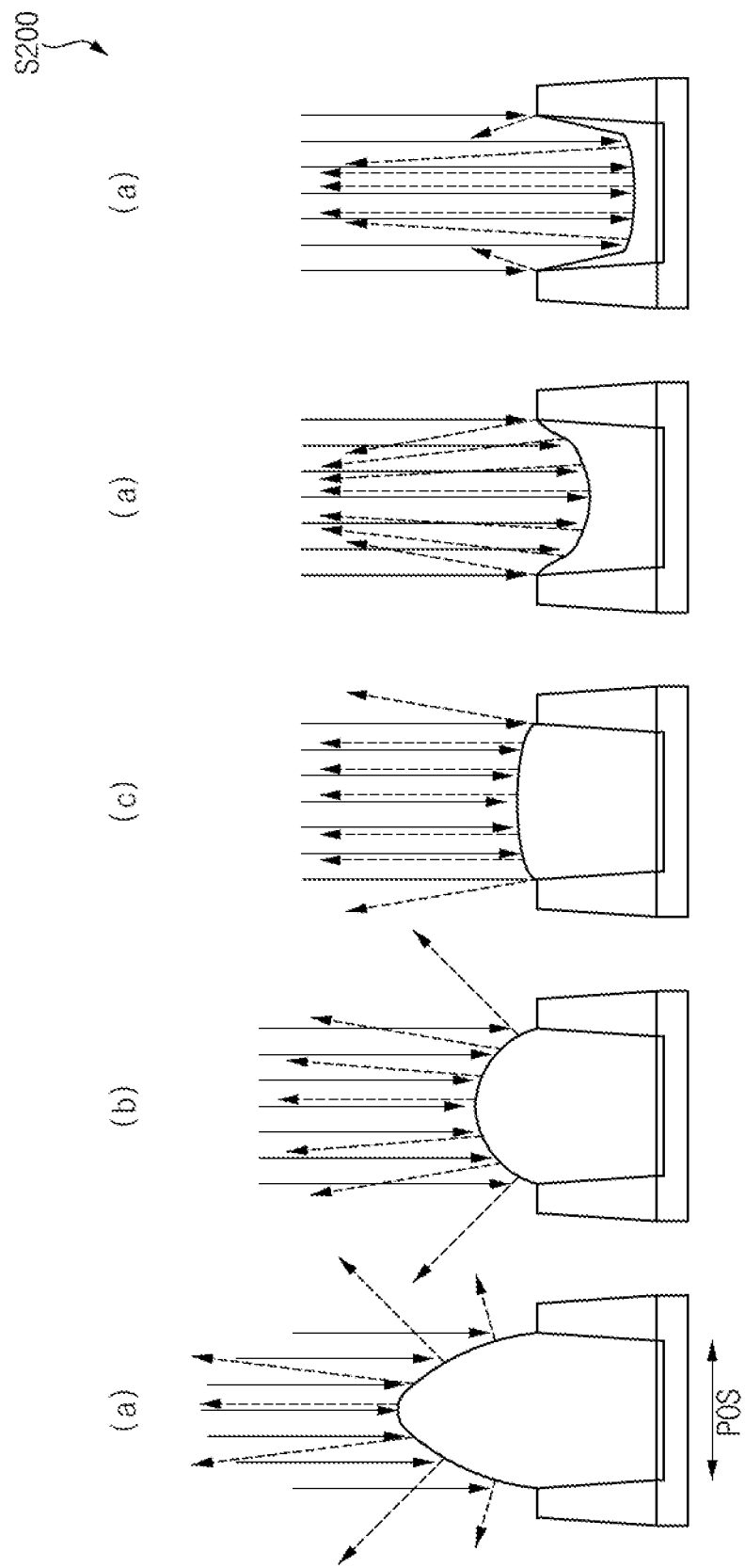

Referring to FIGS. 5 and 6, the input image may be obtained by photographing the substrate SUB (S200).

In case that the droplet is applied onto the substrate SUB, a cross-section of the droplet may start having a convex top surface (see FIG. 6 (a)), then having a flat top surface (see FIG. 6 (c)), and then having a concave top surface (see FIG. 6(e)).

Referring to FIGS. 7, 8, 9, and 10, the brightness data of the input image ID may be converted into the grayscale data GD, and the film shape of the pixel region POS may be analyzed based on the grayscale data GD. The film shape may mean the shape of a surface of the droplet DR applied in the pixel region POS that is changed through the drying process.

Figure 7:
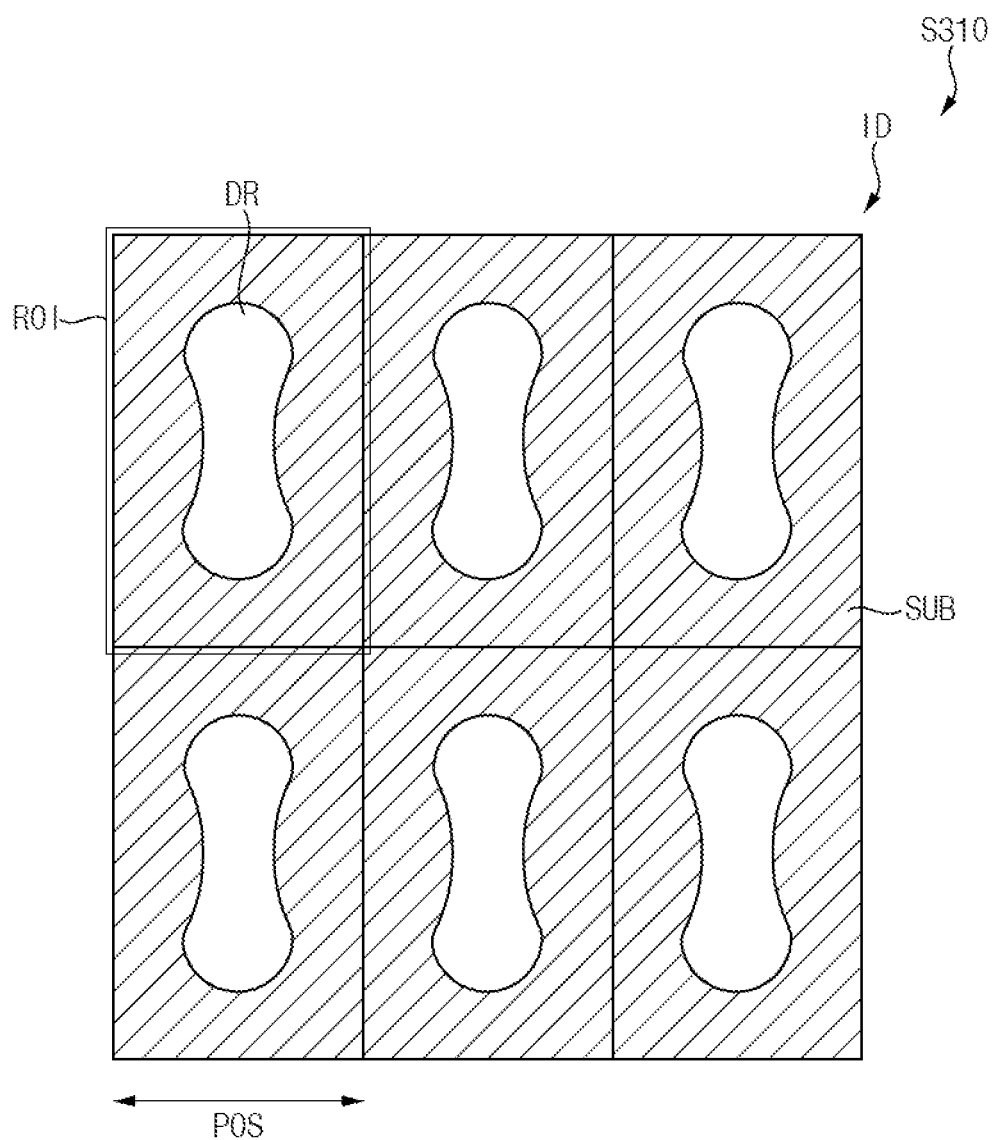

As shown in FIG. 7, at least one-pixel region POS may be set as the region of interest ROI in the input image ID (S310).

The droplet DR may be photographed in the input image ID. Each of the droplets DR may form the dry film having the same film thickness by undergoing the drying process. Alternatively, each of the droplet DR may form the dry film having the different film thickness.

Figure 8:
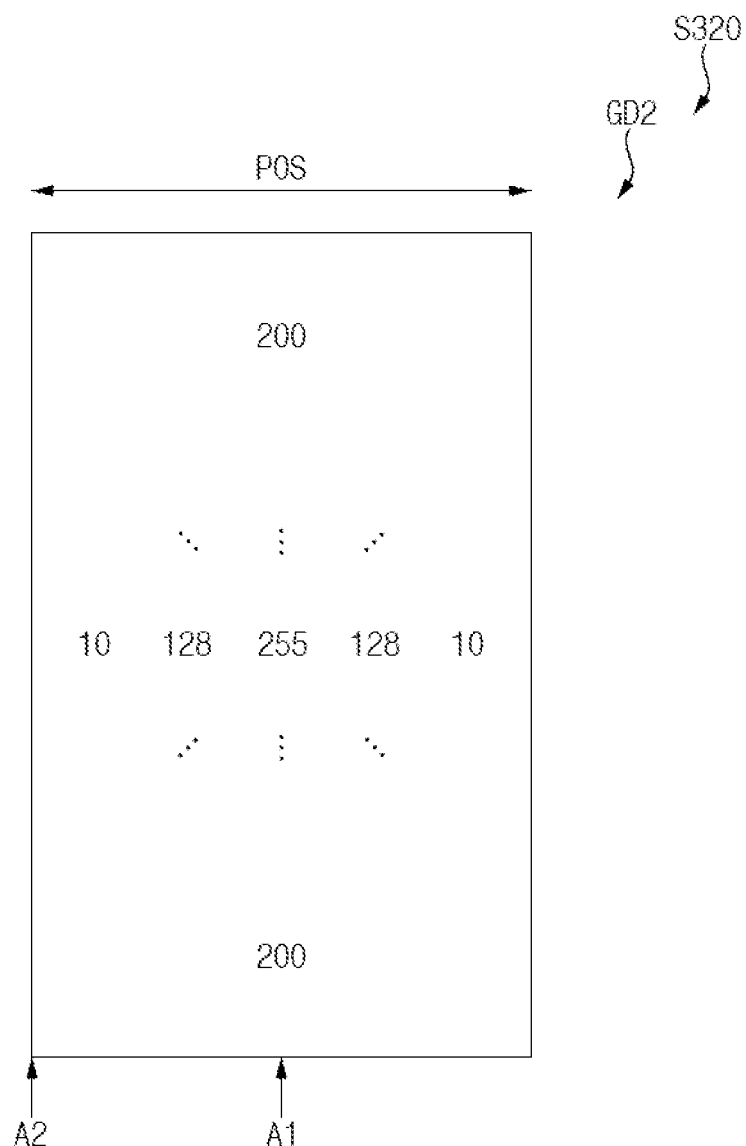

As shown in FIGS. 7 and 8, the brightness data of the region of interest ROI may be converted into the grayscale data GD (S320).

The region of interest ROI may include at least one-pixel region POS. The pixel region POS may include the central region A1 and the outer region A2 surrounding the central region A1.

An intensity of light reflected from the central region A1 and an intensity of light reflected from the outer region A2 may be different from each other. For example, the intensity of light reflected from the central region A1 may be greater than the intensity of light reflected from the outer region A2. Accordingly, the value of the grayscale data GD of the central region A1 may be greater than the value of the grayscale data GD of the outer region A2.

As shown in FIGS. 9A-9E and 10A-10E, a horizontal section L1 of the grayscale data GD for each position of the pixel region POS may be matched with the process condition (S330).

For example, a change in the length of the horizontal section L1 of the grayscale data GD for each position of the pixel region POS may be matched with the change in the internal pressure of the chamber (e.g., the chamber CH of FIG. 5) (e.g., a reduced pressure profile PP).

In case that the drying process starts (T0), the internal pressure of the chamber may be a same as a standard state (STP) (see FIG. 10(a)).

In an initial drying step T1, the internal pressure of the chamber may have a first pressure P1 (see FIG. 10(b)). In the initial drying step T1, a top surface of the droplet may change from the convex shape to the flat shape. Accordingly, the length of the horizontal section L1 of the grayscale data GD may tend to increase.

In an intermediate drying step T2, the top surface of the droplet may change from the flat shape to the concave shape. Accordingly, the length of the horizontal section L1 of the grayscale data GD may tend to decrease (see FIG. 10(d)). At this time, the internal pressure of the chamber may have a second pressure P2.

During the drying process, the internal pressure of the chamber may be reduced. In other words, the second pressure P2 of the intermediate drying step T2 may have a smaller value than the first pressure P1 of the initial drying step T1. A step of matching the reduced pressure profile PP and change of the shape of the droplet (e.g., the droplet of FIG. 7) surface (e.g., the change in the length of the horizontal section L1) may be repeated while changing the process factor. By virtue of this, a relationship between the process factor and the shape of the dry film may be analyzed.

Referring again to FIG. 5, the substrate inspection method may further include at least one of storing the data, deriving the new process recipe, and automatically controlling a facility.

The data may be stored in the storing part 310 (e.g., the storing part 310 of FIG. 2) of the control unit 300. In an embodiment, the storing part may store at least one of the process condition of the chamber, the property of the solution, the input image, the grayscale data, and the like.

The new process recipe may be generated by the condition generating part (e.g., the condition generating part 320 of FIG. 2) of the control unit 300.

In an embodiment, the new process recipe may be generated based on the stored data in the storing part after the property of the solution or the shape 1 of the final film is inputted. To this end, the storing part may further include a standard process recipe. The standard process recipe may include the process condition for forming a film shape (e.g., a predetermined or selectable film shape). For example, the new process recipe may include the reduced pressure profile. The reduced pressure profile may refer to the change in the internal pressure of the chamber over time.

Figure 11:
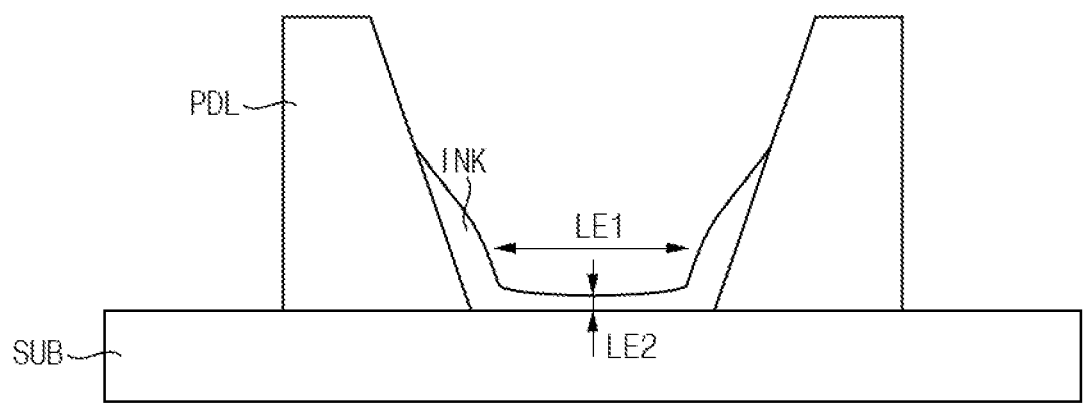

Referring to FIG. 11, the shape of the final film may be precisely controlled through the new process recipe.

In an embodiment, the new process recipe may include the process condition having a large light-emitting region. For example, the new process recipe may include the process condition capable of producing the final film having a largest flat surface length LE1 depending at least partially or entirely on an ink INK type. The light-emitting region may increase as the length LE1 of the flat surface increases.

In an embodiment, the step of inputting the shape of the final film may include inputting the thickness of the final film. The new process recipe may be generated such that the final film includes process conditions having a thickness, e.g., a predetermined or selectable thickness LE2. The predetermined thickness LE2 may correspond to a resonance thickness. The resonance thickness may refer to the thickness of the final film capable of improving luminous efficiency by causing constructive interference.

In an embodiment, inputting the shape of the final film may include inputting the thickness of the final film. The new process recipe may be generated such that the final film includes process conditions having the predetermined thickness LE2. The predetermined thickness LE2 may correspond to the resonance thickness. The resonance thickness may refer to the thickness of the final film capable of improving the luminous efficiency by causing the constructive interference.

For example, the new process recipe may include the process conditions under which the final film may have the resonance thickness. In this case, the new process recipe may be generated based on the stored data in the storing part. The new process recipe may include an amount of ink INK to be ejected into the opening defined by the pixel-defining layer PDL.

Figure 12:
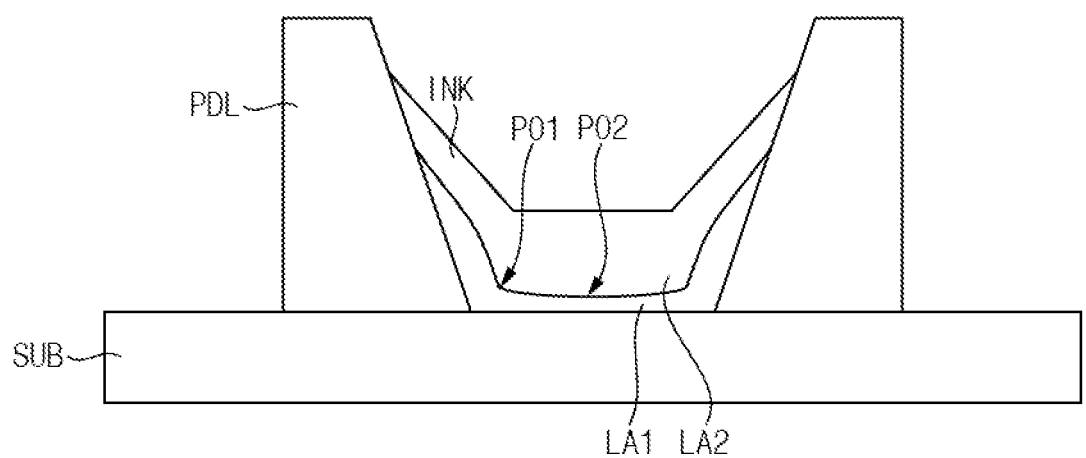

Referring to FIG. 12, the drying process to which the new process recipe is applied may be automatically performed.

Organic layers LA1 and LA2 may be sequentially formed on the substrate SUB.

Each of the organic layers LA1 and LA2 may be formed by ejecting the ink INK into the opening defined by the pixel-defining layer PDL.

A first organic layer LA1 may have a different thickness for each position of the opening defined by the pixel-defining layer PDL. For example, a thickness of the first organic layer LA1 at a first position PO1 may be greater than the thickness of the first organic layer LA1 at a second position PO2. The second position PO2 may be a central portion of the opening. The first position PO1 surrounds the central portion and may be adjacent to the pixel-defining layer PDL.

In order to have a flat upper surface of a light-emitting region, a thickness of the second organic layer LA2 may be different for each position. For example, the thickness of the second organic layer LA2 at the first position PO1 may be greater than the thickness of the second organic material layer LA2 at the second position PO2. The new process recipe may include the process conditions for forming the second organic layer LA2 to have the thickness for the each position.

The reduced pressure drying device (e.g., the reduced pressure drying device RPDE of FIG. 5) may automatically perform the drying process to which the new process recipe is applied.

Figure 13:
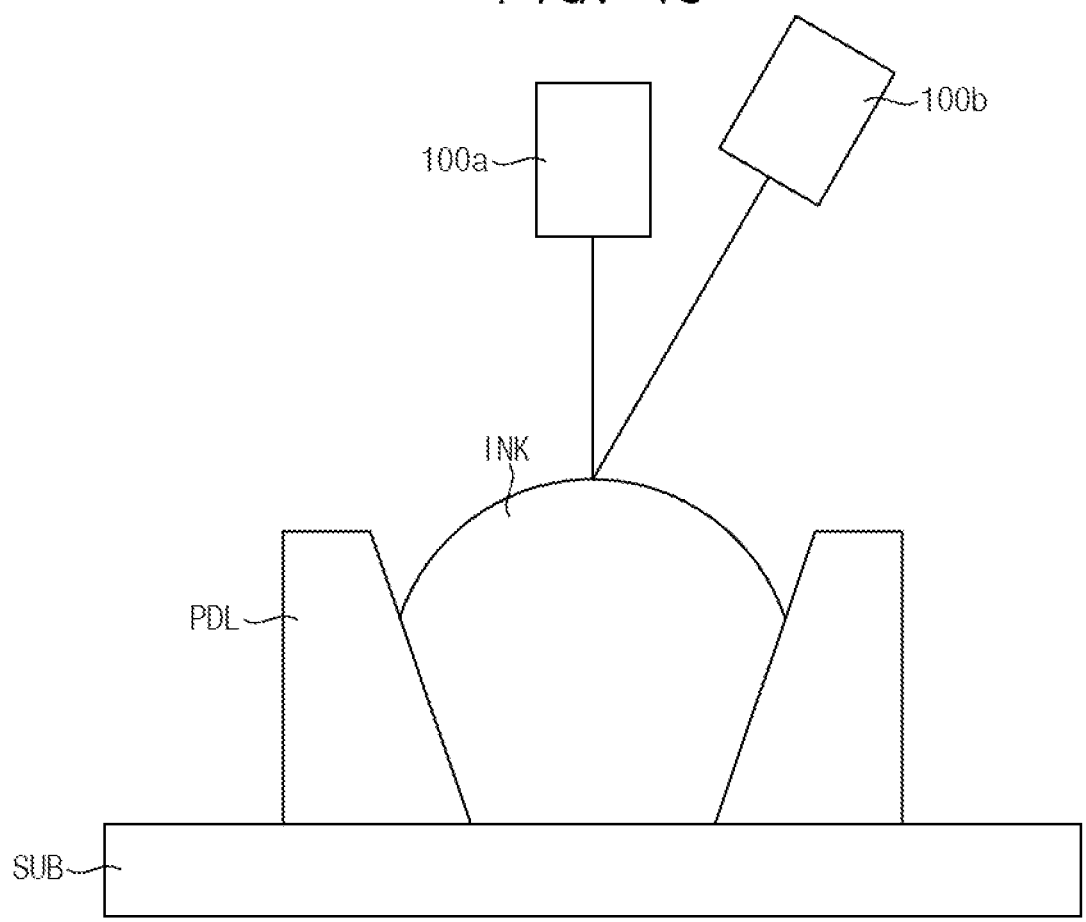

Referring to FIG. 13, the droplet angle of the solution may be calculated based at least partially or entirely on the input image (e.g., the input image ID of FIG. 9).

In an embodiment, the input image may be obtained at various angles. For example, the input images may be obtained from imaging units 100a and 100b installed at various angles.

Figure 10:
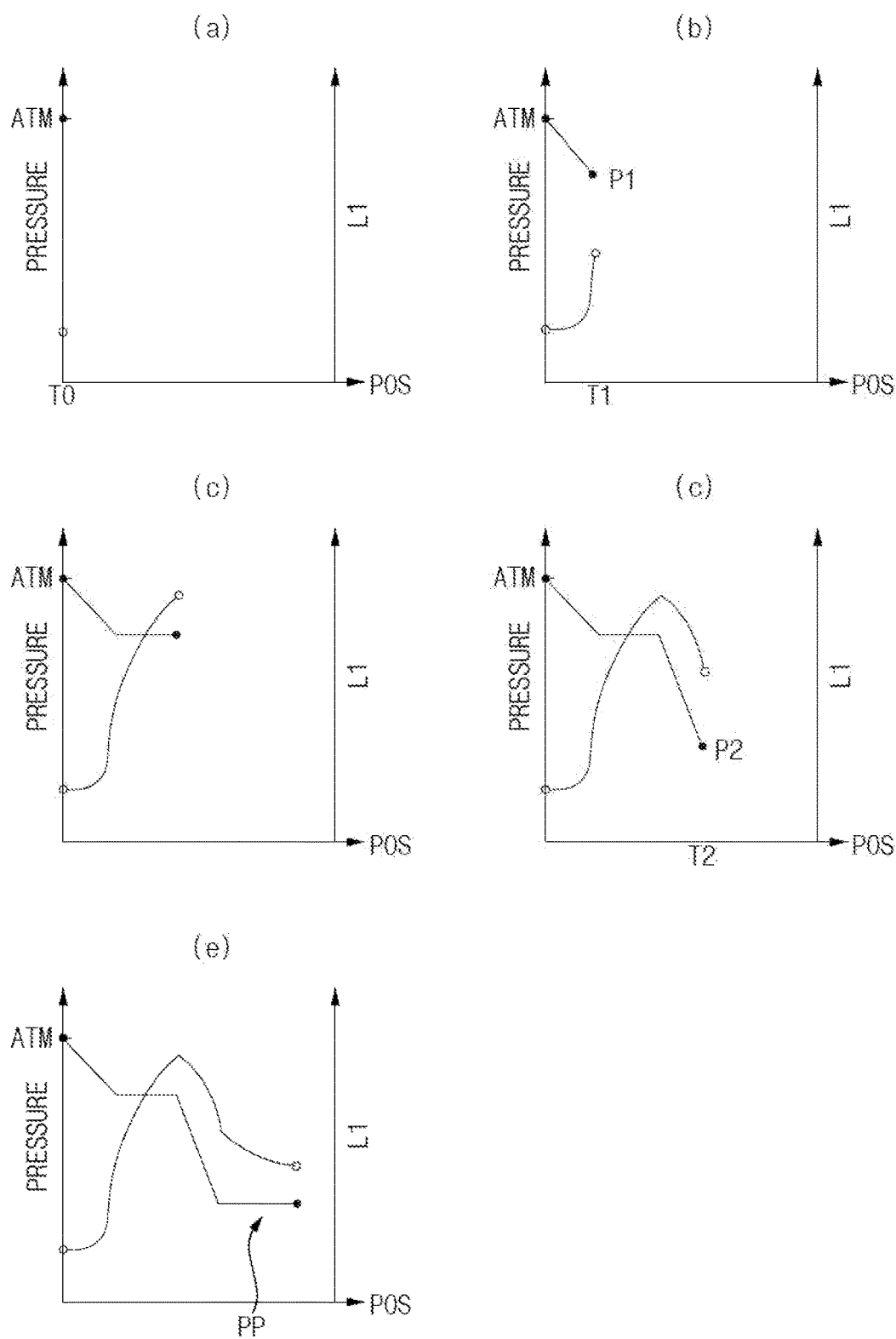

The input images obtained from the various angles may be converted into the grayscale data (e.g., the grayscale data GD of FIG. 10). The angle of the ink droplet may be calculated through the length of the horizontal section (e.g., the horizontal section L1 of FIG. 11) of the grayscale data.

The length of the horizontal section L1 of the grayscale data may be largest in case that the ink INK droplet angle and the photographing angle of the input image are substantially equal to each other. The thickness of the final film may be calculated with the droplet angle.

The disclosure may be applied to a manufacturing process of various display devices. For example, the disclosure may be applied to a high-resolution smartphone, a mobile phone, a smart pad, a smart watch, a tablet PC, a vehicle navigation system, a television, a computer monitor, a notebook, or the like.

The above description is an example of technical features of the disclosure, and those skilled in the art to which the disclosure pertains will be able to make various modifications and variations. Thus, the embodiments of the disclosure described above may be implemented separately or in combination with each other.

The embodiments disclosed in the disclosure are intended not to limit the technical spirit of the disclosure but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A substrate inspection device comprising:
    an imaging part that is disposed in a chamber and obtains an input image by photographing a substrate coated with a solution; and
    an analysis part that converts brightness data of the input image into grayscale data and analyzes a film shape of a pixel region based on the grayscale data.

2. The substrate inspection device of claim 1, wherein the analysis part includes:
    a region setting part that sets at least one-pixel region as a region of interest in the input image;
    a converting part that converts brightness data of the region of interest into the grayscale data; and
    a matching part that matches a horizontal section of the grayscale data for each position of the pixel region with a process condition of the chamber.

3. The substrate inspection device of claim 2, wherein the pixel region includes a central region and an outer region surrounding the central region, and grayscale data of the central region is greater than grayscale data of the outer region.

4. The substrate inspection device of claim 1, further comprising:
    a control part including a storing part,
    wherein the storing part that stores a process condition of the chamber, a property of the solution, the input image, and the grayscale data.

5. The substrate inspection device of claim 4, wherein the control part further includes a condition generating part that derives a process recipe based on data stored in the storing part in case that the property of the solution or a shape of final film is inputted.

6. The substrate inspection device of claim 5, wherein the shape of the final film includes a thickness of the final film.

7. The substrate inspection device of claim 5, wherein the process recipe includes a reduced pressure profile in the chamber.

8. The substrate inspection device of claim 5, wherein the control part further includes a facility control part that controls the chamber to automatically proceed with a drying process based on the process recipe generated by the condition generating part.

9. The substrate inspection device of claim 1, wherein the imaging part is disposed in a direction intersecting a normal line of the substrate.

10. The substrate inspection device of claim 1, wherein the analysis part further includes an angle calculating part that calculates a droplet angle of the solution based on the input image.

11. A substrate inspection method comprising:
    disposing a substrate coated with a solution in a chamber;
    obtaining an input image by photographing the substrate; and
    analyzing a film shape of a pixel region based on grayscale data by converting brightness data of the input image into grayscale data.

12. The substrate inspection method of claim 11, wherein the analyzing of the film shape includes:
    setting at least one-pixel region in the input image as a region of interest;
    converting brightness data of the region of interest into the grayscale data; and
    matching a horizontal section of the grayscale data for each position of the pixel region with a process condition of the chamber.

13. The substrate inspection method of claim 12, wherein the pixel region includes a central region and an outer region surrounding the central region, and grayscale data of the central region is greater than grayscale data of the outer region.

14. The substrate inspection method of claim 11, further comprising:
    storing a process condition of the chamber, a property of the solution, the input image, and the grayscale data.

15. The substrate inspection method of claim 14, further comprising:
    inputting the property of the solution or a shape of final film; and
    deriving a process recipe based on the stored process condition of the chamber, the stored property of the solution, the stored input image, and the stored grayscale data.

16. The substrate inspection method of claim 15, wherein the inputting of the shape of the final film is inputting a thickness of the final film.

17. The substrate inspection method of claim 15, wherein the deriving of the process recipe is deriving a reduced pressure profile in the chamber.

18. The substrate inspection method of claim 15, further comprising:
controlling the chamber to automatically proceed with a drying process based on the process recipe after the deriving of the process recipe.

19. The substrate inspection method of claim 11, wherein the input image is obtained by an imaging part disposed in a direction intersecting a normal line of the substrate.

20. The substrate inspection method of claim 19, wherein the analyzing of the film shape includes calculating a droplet angle of the solution based on the input image.

* * * * *